(12) United States Patent
Luly et al.

(10) Patent No.: US 8,153,096 B2
(45) Date of Patent: Apr. 10, 2012

(54) HYDROGEN FLUORIDE COMPOSITIONS

(75) Inventors: Matthew H. Luly, Hamburg, NY (US); Bernard E. Pointner, Buffalo, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/035,429

(22) Filed: Feb. 25, 2011

(65) Prior Publication Data

US 2011/0152432 A1   Jun. 23, 2011

Related U.S. Application Data

(62) Division of application No. 12/132,741, filed on Jun. 4, 2008, now Pat. No. 7,914,761.

(60) Provisional application No. 60/942,887, filed on Jun. 8, 2007, provisional application No. 60/943,026, filed on Jun. 8, 2007.

(51) Int. Cl.
*C01B 7/19* (2006.01)
*C01B 7/07* (2006.01)
*C08K 3/00* (2006.01)
*B29C 73/16* (2006.01)

(52) U.S. Cl. ........ 423/484; 423/483; 423/488; 524/438; 524/462; 516/105; 516/108

(58) Field of Classification Search .................. 423/483, 423/484, 488; 524/438, 462; 516/105, 108
See application file for complete search history.

(56) References Cited

U.S. PATENT DOCUMENTS

| 1,470,772 A | 10/1923 | Simon |
| 3,635,836 A | 1/1972 | Mullen |
| 4,383,868 A | 5/1983 | Braley |
| 6,177,058 B1 * | 1/2001 | Singh et al. ................... 423/483 |

* cited by examiner

*Primary Examiner* — Michael M Bernshteyn

(57) ABSTRACT

The present technology provides compositions that are intimate mixtures of hydrogen fluoride and a polyacrylate-polyacrylamide cross-linked copolymer, as well as methods and preparing and using such compositions. The compositions are less hazardous and, therefore, more conveniently stored, transported, and handled in comparison to pure hydrogen fluoride. Further, the hydrogen fluoride may be readily recovered from the compositions of the invention for use.

10 Claims, 1 Drawing Sheet

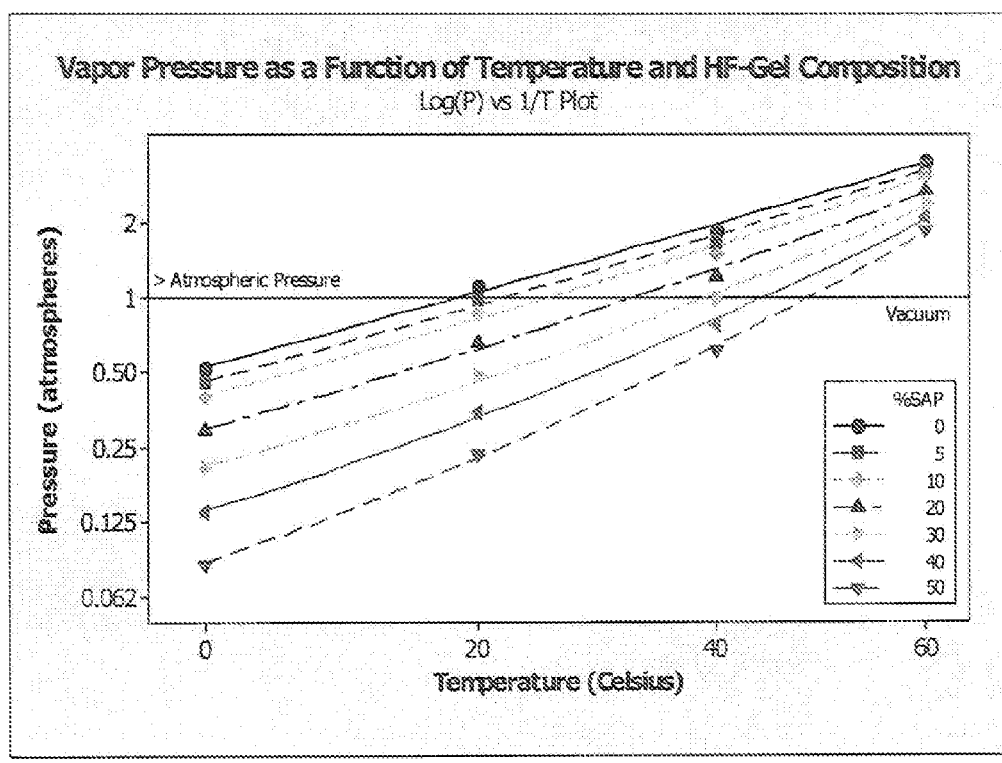

HYDROGEN FLUORIDE COMPOSITIONS

CROSS REFERENCE TO RELATED APPLICATIONS

This application is a divisional of U.S. application Ser. No. 12/132,741, filed Jun. 4, 2008, which is related to, and claims priority to, U.S. application Ser. No. 60/942,887, filed Jun. 8, 2007, and U.S. application Ser. No. 60/943,026, filed Jun. 8, 2007, all of which are incorporated herein by reference.

BACKGROUND

1. Field of Invention

The present invention relates to hydrogen fluoride compositions. More particularly, the present invention provides compositions of hydrogen fluoride and a polymer that are less hazardous and, therefore, more easily stored, transported, and handled in comparison to pure hydrogen fluoride.

2. Description of Related Art

Hydrogen fluoride is a well known compound that is used in industry in a variety of processes including in alkylation reactions as a catalyst, in fluorination reactions as a fluorinating agent, in the manufacture of fluorides, in the separation of uranium isotopes, and in the production of fluorine containing plastics. It is well known that hydrogen fluoride is a volatile, extremely hazardous substance the high vapor pressure of which renders it readily aerosolizable.

In an attempt to diminish the hazards of hydrogen fluoride, it has been combined with a variety of substances. U.S. Pat. No. 1,470,772 discloses a glass etching paste of mucilage, sulfuric acid, and ammonium fluoride in which the hydrogen fluoride is formed in situ. U.S. Pat. No. 3,635,836 discloses dispersions of hydrogen fluoride, particulate proteinaceous material and a small amount of carboxyl substituted vinyl polymers useful as pickling agents, plumbing cleaners and paint removers. U.S. Pat. No. 4,383,868 discloses a method of treating anhydrous hydrogen fluoride spills by applying a particulate mixture of polyacrylamide and a polyalkyl(alk)acrylate to the surface of the spill. However, none of these compositions provides an intimate mixture of hydrogen fluoride and a substance that both reduces the hazards of hydrogen fluoride and, at the same time, permits the ready recovery of the hydrogen fluoride from the composition.

To overcome these problems, it has been suggested to provide a mixture of hydrogen fluoride and water-soluble polymer. For example, U.S. Pat. No. 6,177,058 describes gelatinous mixtures of hydrogen fluoride (HF) and sodium polyacrylate or polyacrylamide.

Notwithstanding these compositions, there remains a need for polymers having superior mixing properties with hydrogen fluoride, such as higher capacity for HF per unit mass of polymer. The present invention satisfies these needs among others.

SUMMARY OF THE INVENTION

The present inventors have found that polyacrylate-polyacrylamide cross-linked copolymers have a much higher capacity for retaining HF and other advantages compared to other polymers known in the art. The surprisingly large increase in capacity is particularly advantageous in certain applications of the copolymer, such as the formation of a copolymer/HF gel that can safely be transported. For example, a large capacity means that the relative proportion of HF to copolymer in the gel is high which reduces shipping costs because more of the desired HF is transported per unit mass.

In addition, it has been discovered that intimate mixtures of polyacrylate-polyacrylamide cross-linked copolymers and hydrogen fluoride form a composition in which hydrogen fluoride volatility is diminished. This composition is also more viscous and has a greater surface tension when compared to pure hydrogen fluoride, thus hindering formation of a hydrogen fluoride aerosol cloud. Therefore, the compositions of the present invention are less hazardous compared to anhydrous hydrogen fluoride in liquid or gaseous form.

The polyacrylate-polyacrylamide cross-linked copolymers polymers can also be used to treat spills or leaks of HF, making them less hazardous and easier to clean up. The composition of the present invention can also be used in processes as an HF catalyst and as a fluorinating agent. It can also be used to etch silicon based materials and clean oxide scale.

Accordingly, the present invention provides a composition comprising hydrogen fluoride and a cross-linked copolymer comprising acrylamide and acrylate, wherein the composition is in the form of a solid or a gel. In highly preferred embodiments of the invention, the composition comprises anhydrous hydrogen fluoride, a cross-linked copolymer comprising acrylamide cross-linked with an acrylic acid salt, wherein the composition is in the form of a solid or a gel.

Another aspect of the invention is a method for preparing a hydrogen fluoride composition comprising the steps of (a) providing a cross-linked copolymer comprising acrylamide and acrylic acid salt; and (b) contacting said cross-linked copolymer with anhydrous hydrogen fluoride to form a composition according to claim 1.

Another aspect of the invention is a method for storing hydrogen fluoride comprising the steps of (a) preparing an HF/cross-linked copolymer composition as described herein; and (b) storing the composition in a storage container.

Another aspect of the invention is a method for recovering hydrogen fluoride comprising the steps of (a) providing an HF/cross-linked copolymer composition as described herein; and (b) treating the composition so as to liberate a hydrogen fluoride vapor.

Yet another aspect of the invention is a method for transporting hydrogen fluoride comprising the steps of (a) preparing HF/cross-linked copolymer composition as described herein; (b) storing the composition in a storage container; and (c) transporting the storage container to a destination.

BRIEF DESCRIPTION OF THE DRAWING

The Figure is a graphical representation of vapor pressure as a function of temperature and HF-Gel composition.

DESCRIPTION OF PREFERRED EMBODIMENTS OF THE INVENTION

The present invention provides solid and semi-solid compositions comprising hydrogen fluoride compositions that facilitate the safe use, transport, and storage of hydrogen fluoride. Further, the chemical properties of the hydrogen fluoride in the compositions of the present invention are substantially unchanged from those of hydrogen fluoride in its pure state and, thus, hydrogen fluoride may be readily and quantitatively recovered from the compositions.

In certain preferred embodiments of the invention, provided are compositions comprising intimate mixtures of hydrogen fluoride and an effective amount of a polyacrylate/ polyacrylamide crossed-linked copolymer. These mixtures preferably are solid or semi-solid (e.g., gelatinous).

As used herein, the term "copolymer" means a polymer having two or more different monomer residues that have been polymerized and constructed as one or more chains. The arrangements of these monomer units in the chain include those that regularly alternate the different monomers or those that repeat monomer units in regular or random sequences. In addition, the chain can be straight, branched, or grafted, or can exist as a block copolymer.

As used herein, the term "cross-linked" means the attachment of two chains of polymer molecules by bridges composed of an element, a functional group, a compound, or a polymer unit, which join certain atoms of the chains by primary chemical bonds. In certain embodiments, cross-linking occurs between two or more polymer chains to form a copolymer structure. In certain other embodiments, cross-linking occurs between two or more copolymer chains that are similar in arrangement. Preferably, cross-linking occurs between amide groups and carboxylic groups of the copolymer.

The cross-linked copolymer of the present invention in its dry form is preferably solid in the form of a powder, granules, pellets, fiber, fabrics, mats, and pads and the like. When exposed to hydrogen fluoride, the copolymer chains expand or unfold and uptake or absorb hydrogen fluoride to form a solid or a semi-solid material, such a gel. Due to the copolymer's cross-linking, the copolymer is insoluble in hydrogen fluoride and water.

Though not intending to be bound by a particular theory, it is believed that hydrogen fluoride uptake by the copolymer is facilitated by the negative carboxylic groups of the copolymer and their solvation with hydrogen fluoride molecules. For embodiments in which the copolymer comprises an alkali metal or ammonium ion (e.g., copolymers formed with an acrylic acid salt), it is believed that, in the presence of hydrogen fluoride, the alkali metal or ammonium disassociates from the carboxyl group creating two ions: a carboxyl ($COO^-$) and an alkali metal or ammonium ion (e.g., $Na^+$). The carboxyl groups begin to repel each other because they have the same negative charge. This repulsion unfolds or swells the polymer chain. The swelling action also allows more hydrogen fluoride to associate with the polymer chain and reside in the spaces within the polymer's network. The cations are also likely to associate with the hydrogen fluoride. Furthermore, HF is also known to form complexes with amines and the N groups in the polymer may also facilitate uptake of HF by the polymer.

The cross-linking between polymer chains prevents the copolymer from dissolving in liquid hydrogen fluoride or other liquids. When the chains become solvated, the cross links prevent them from moving around randomly. In general, the cross-linking affects the copolymer's adsorption capacity, with more cross links in a chain corresponding to a decrease in the polymer's ability to adsorb liquids. (See, e.g., *Osmosis and Super Absorbent Polymers*, U. of Illinois at Urbana-Champaign.) However, the inventors have surprisingly found that cross-linked copolymers of the present invention have a significantly higher capacity for liquid hydrogen fluoride compared to the copolymer's constituent polymers individually.

Preferred cross-linked copolymers of the present invention are constructed of both acrylamide units and acrylate units. Within the scope of the term "acrylamide", included is acrylamide itself (i.e., 2-propenamide), polyacrylamides, polyalkylacrylamides (e.g., polymethylacrylamide), monomer residues of such acrylamides, and derivatives thereof. As used herein, the term "derivative" means a compound or chemical structure having the same fundamental structure or underlying chemical basis as the relevant related compound. Such a derivate is not limited to a compound or chemical structure produced or obtained from the relevant related compound. Acrylamide units that can be utilized in the present invention include individual structural units of acrylamide, repeating units of acrylamide, and polymer chains constructed, at least in part, of acrylamides.

Within the scope of the term "acrylate", included is acrylic acid (i.e., 2-propenoic acid), acrylic acid salt (e.g., sodium acrylate, potassium acrylate, and the like), alkylacrylates (e.g. methyl acrylate, butyl methylacrylate, and the like), polyacrylates, polyalkylacrylates, polyacrylic salts, monomer residues of such acrylates, and derivatives thereof. Acrylate units that can be utilized in the present invention include individual structural units of acrylates, repeating units of acrylates, and polymer chains constructed, at least in part, of acrylates.

Particularly preferred acrylic acid salts include potassium acrylate, sodium acrylate, and ammonium acrylate, with potassium acrylate being particularly preferred.

Polyacrylate-polyacrylamide cross-linked copolymers are commercially available from a variety of sources including Degussa AG of Krefeld, Germany (sold under the trade name STOCKOSORB®), Kyoritsu Yukikogyo Kenkyusho of Japan (sold under the trade name Hymosab® 200), and Aldrich of Milwaukee, Wis. (Cat. No. 43,277-6).

Copolymers of the present invention preferably comprise from about 1 to about 99 weight percent, and more preferably from about 5 to about 60 weight percent, of acrylamide units based upon the total weight of the copolymer. Copolymers of the present invention also preferably comprise from about 1 to about 99 weight percent, and more preferably from about 5 to about 60 weight percent, of acrylate units based upon the total weight of the copolymer.

Generally, the cross-linked copolymers used in the invention have molecular weights of from about 5,000 to about 10,000,000. Preferably, cross-linked copolymers with molecular weights of from about 5,000 to about 5,000,000 are used.

To prepare the compositions of the invention, an effective amount of a cross-linked copolymer is mixed with hydrogen fluoride in any suitable corrosion resistant vessel to form an intimate mixture. An effective amount of cross-linked copolymer is an amount capable of decreasing the volatility and increasing the surface tension of the hydrogen fluoride to the level desired for the end use. Addition of the cross-linked copolymer and hydrogen fluoride may be performed in any sequence. Mixing may be accomplished by any means convenient, including without limitation, stirring or dispersing the copolymer into a pool of hydrogen fluoride or passing hydrogen fluoride gas over the cross-linked copolymer. The hydrogen fluoride may be commercially available anhydrous hydrogen fluoride having a water content of 0.1% or less or aqueous hydrogen fluoride. Preferably, anhydrous hydrogen fluoride is used. The polymer may be in any form suitable for mixing with the hydrogen fluoride including, without limitation, granules, beads, pellets, fibers, or mats. Mixing will occur faster for smaller particle sizes of the polymer and slower for larger sizes. Typically mixing is performed at temperatures from about 0 to about 100° C., preferably from about 10 to about 40° C., and even more preferably from about 10 to about 25° C. Pressure is not critical to the mixing operation, although capacity is generally lower at increased pressure.

The amount of hydrogen fluoride and cross-linked copolymer used will depend in part on the particular cross-linked copolymer selected and the desired end-use for the composition. If the cross-linked copolymer has a relatively low molecular weight, the resulting HF/ cross-linked copolymer composition will be a viscous liquid. If the cross-linked copolymer has a relatively high molecular weight, the resulting composition will be a solid or semi-solid material (e.g., gel). Additionally, the amount of cross-linked copolymer used will determine whether or not the resulting composition is a solid or liquid. Generally, up to about 1 percent by weight, based on the total weight of the composition, of cross-linked copolymer is used the composition will be a viscous liquid. Compositions in which the amount of cross-linked copolymer is at least about 2 weight percent, generally, will take a gel-like semi-solid form.

It should be noted further that a higher weight percentage of cross-linked copolymer will lead to a greater the reduction in vapor pressure and an increase in surface tension. In certain embodiments, the reduction in surface tension will reduce hydrogen fluoride aerosolization. However, with an increase in weight percentage of cross-linked copolymer, the weight percentage of hydrogen fluoride in the composition decreases which may affect the composition's suitability for a desired end-use. Therefore, the effective amount of hydrogen fluoride and cross-linked copolymer used will depend on a consideration of a number of factors. Generally, from about 0.5 to about 99.9 weight percent of cross-linked copolymer and from about 99.5 to about 0.1 weight percent of hydrogen fluoride is used. Preferably, from about 2 to about 50 weight percent cross-linked copolymer and from about 98 to about 50 weight percent hydrogen fluoride, more preferably from about 2 to about 20 weight percent of cross-linked copolymer and from about 98 to about 80 weight percent of hydrogen fluoride is used.

The inventors have found that the cross-linked copolymers of the present invention have an exceptionally high capacity for hydrogen fluoride. It is possible to measure the capacity of a polymer for HF by mixing the polymer with an excess of HF, allowing the mixture to stand for a period of time such that the polymer becomes saturated, gravity or suction filtering off the excess HF, and weighing the saturated polymer as well as the excess HF.

Although cross-linked copolymer capacity is important to a practical HF-gel system, other properties should be considered as well. Other properties of interest include an exotherm upon mixing the copolymer and HF, vapor pressure of the resulting composition, viscosity of the composition, gelatinization time, density per unit volume of the starting polymer, capacity of the composition under pressure, ease of recovery of the HF from the composition, reduction in HF aerosol formation by the system, and mixing or dispersing of the polymer into HF.

It is contemplated therefore, that in addition to polyacrylate/polyacrylamide crossed-linked copolymers, other HF-absorbing polymers and copolymers may be practiced with the present invention. Preferably, these other polymers and copolymers will be mixed with the polyacrylate/polyacrylamide crossed-linked copolymer to optimize several properties of the composition. For example, for applications in which the time required to gel a given quantity of HF is important, the invention involves a mixture a copolymer having high HF capacity and another polymer or copolymer which gels quickly. The evolution of excessive heat may accompany the formation of the gel when HF and a copolymer or polymer are mixed. Accordingly, certain embodiments of the invention utilize a mixture of a high capacity cross-linked copolymer and a polymer or copolymer with a lower capacity that exhibits a smaller exotherm.

Examples of other polymers that may be mixed with a polyacrylate/polyacrylamide crossed-linked copolymer include those described in U.S. Pat. No. 6,177,058, which is incorporated herein by reference. Preferred polymers include water soluble polymers selected from the group consisting of cellulose ethers, modified starches, starch derivatives, natural gum derivatives, polyacrylic acid salts, ethylene oxide polymer, methacrylic acid polymer, polyethyleneimine polymer, polyvinyl pyrrolidone polymer and mixtures thereof.

Without departing from the scope of the invention, it will be recognized that other components also may be included in the compositions of this invention. The specific nature of these components will depend on the desired end use of the compositions. In general, any component that does not deleteriously effect the surface tension of the composition, or undesirably increase the volatility of the hydrogen fluoride component, may be used.

Hydrogen fluoride may be recovered readily from the composition of the invention by treating the composition so as to liberate hydrogen fluoride vapors. One means of treating the compositions in order to liberate hydrogen fluoride vapor is by heating the composition at elevated temperatures, generally from about 0 to about 200° C., preferably from about 80 to about 150° C., resulting in the liberation of hydrogen fluoride vapor. The vapor may then be condensed by any convenient means. Alternatively, the hydrogen fluoride may be liberated by decreasing the pressure over the composition or increasing both the pressure and temperature and then condensing the vapors. This alternative means for recovering hydrogen fluoride may be accomplished at pressures of from about 60 to about 1 psia and temperatures of from about 20 to about 50° C. As yet another alternative, hydrogen fluoride value may be recovered from the compositions by use of the compositions in any of the wide variety of processes that use hydrogen fluoride, such as those involving a HF catalyst, fluorinating agent, chemical synthesis, etching processes, and cleaning processes.

The compositions of the invention provide a convenient and safe method for storing hydrogen fluoride. Because the compositions exhibit little or no volatilization of hydrogen fluoride, the hazards of storing the hydrogen fluoride are significantly reduced. Further, the hydrogen fluoride may be recovered from the stored composition by the means described herein. Additionally, the stored material may be safely transported. The compositions of the invention may be prepared and then placed in a storage container by any convenient means. Alternatively, the compositions may be prepared in the storage container. Suitable storage containers are those containers made of, or lined with, a hydrogen fluoride resistant material such as carbon steel, fluoropolymers, MONEL®, and the like. Storage of the compositions may be for any length of time provided that the compositions are not exposed to air or other chemicals. Preferably, storage is under ambient conditions.

The stored composition may be safely and efficiently transported to a destination. Transporting of the composition may employ any conventional means such as rail car or truck. Once delivered to the destination, the stored composition may be treated to recover the hydrogen fluoride from the composition for use.

EXAMPLES

The invention will be clarified further by a consideration of the following examples that are intended to be purely exemplary.

Example 1

Approximately, 0.5 grams of Stockosorb M (acrylamide/potassium acrylate copolymer, cross-linked), commercially available from Degussa AG, of Krefeld, Germany, was placed into a perfluoroalkoxy (PFA) vessel fitted with a screen above the polymer, and evacuated. The PFA vessel was then weighed, and cooled to about −78° C. About 29 grams of anhydrous HF were distilled onto the polymer. The PFA vessel was warmed to room temperature and weighed. After about two hours, the PFA vessel was inverted and the excess HF drained into a second, evacuated PFA vessel. The HF-polymer gel reamined on the filter screen in the first PFA vessel. The vessel containing the polymer gel was again weighed and the polymer found to have absorbed about 45.6 grams of HF per gram of polymer. This experiment was repeated several times and the average capacity was found to be about 45.2 grams of anhydrous HF per gram of polymer, which is reported in Table 1.

Examples 2-4

The procedure in Example 1 was repeated for Examples 2-4, except that Stockosorb M was substituted for Stockosorb CW, FW, and SW, respectively. The results for each composition are reported in Table 1.

Example 5

The procedure in example 1 was hard to perform with small particle sized polymers and had unacceptable scatter in the results, so a different approach was taken to characterize their capacity. Approximately 0.5 grams of Stockosorb CW was placed in a PFA vessel, connected to a vessel containing HF, and the system was evacuated. The valve of the HF container was opened and the polymer allowed to absorb HF vapor for two days. At the end of this period the polymer had adsorbed 37.62 grams of HF/gram of polymer. The experiment was repeated with fresh polymer which was allowed to absorb HF vapor for about 4 days. At the end of this period the polymer had adsorbed 40.90 grams of anhydrous HF per gram of polymer. The average of these two measurements is reported in Table 1. Although this technique is different than the approach described in example 1, it shows the polymer absorbs much more HF than previously reported systems.

Example 6

The procedure in example 2 was repeated with Stockosorb FW. The average of multiple runs for each composition is reported in Table 1.

Comparative Examples 7-15

The procedure in example 1 was repeated, except with the polymers listed Table 1. The HF capacities of these polymers is summarized in Table 1. The test results show that acrylamide/potassium acrylate cross-linked copolymers have a much higher HF capacity compared to acrylate polymers.

Example 16

A small amount of Stockosorb M was placed into a previously weighed FEP vessel. The vessel was evacuated and weighed again to determine the weight of polymer (0.1111 grams). The sample was then reconnected to the metal vacuum line, cooled to −78° C. and an excess of HF distilled onto the polymer. The weight of the vessel+polymer+HF was then obtained. The vapor pressure of this system was measured at 20° C. A small amount of HF was then distilled from the vessel and the weight of the vessel+polymer+HF was then obtained. The vapor pressure of this reduced HF system was again measured at 20° C. This procedure was repeated multiple times until nearly all of the HF had been removed. This experiment was run in triplicate, the vapor pressures were then calculated at several standard compositions and plotted in FIG. 1. The results demonstrate the low vapor pressure of the composition.

Example 17

Example 16 was repeated at 0° C. The results are shown in FIG. 1.

Example 18

Example 16 was repeated at 40° C. The results are shown in FIG. 1.

Example 19

Example 16 was repeated at 60° C. The results are shown in FIG. 1.

Example 20

About 8 grams of Stockosorb M was quickly added to a cylinder containing about 180 grams of HF at 20° C. In about 160 seconds the HF was about 65% gelled based on the height of the expanding polymer in the cylinder. Shortly afterward, the HF was completely gelled. The temperature of the cylinder contents reached 29° C. before cooling to 20° C. This test demonstrates the rapid uptake of HF by the copolymer.

Example 21

Approximately, 0.49 grams of Stockosorb M (acrylamide/potassium acrylate copolymer, cross-linked), commercially available from Degussa AG, of Krefeld, Germany, was placed into a perfluoroalkoxy (PFA) vessel fitted with a screen above the polymer, and evacuated. About 78.8 grams of aqueous HF (49 wt %) transferred onto the polymer. The PFA vessel was weighed. After about two hours, the PFA vessel was inverted and the excess HF drained in a second, evacuated PFA vessel. The HF-polymer gel remained on the filter screen in the first PFA vessel. The vessel containing the polymer gel was again weighed and the polymer found to have absorbed about 72.5 grams of aqueous HF per gram of polymer.

Comparative Example 22

About 150 grams of water was added to 0.5 grams of Stockosorb M and allowed to sit for about 2 hours. The mixture was then filtered. Based on the weight increase, the polymer absorbed about 254 grams of water per gram of polymer.

Comparative Example 23

About 165 grams of deionized water was added to 0.58 grams of poly(acrylic acid) partial sodium salt from Aldrich, mixed, and filtered as in comparative example 14. The polymer absorbed about 231 grams of water per gram of polymer. The Stockosrob M therefore absorbed about 10% more water than this Aldrich polymer. Based on these water examples the two polymers have very similar absorbent capacities for water. It is therefore completely unexpected that the Stockosorb absorbs about 22 times more HF than the Aldrich polymer (Table 1).

Example 24

Polymer A, which quickly absorbs HF will be mixed with polymer B which absorbs HF more slowly, but yields a gel with a lower vapor pressure than polymer A. This polymer mixture will then be added to HF. The resulting gel will form quickly and will have an acceptably lower vapor pressure and reduced tendency to form HF aerosol droplets.

Example 25

Polymer C, which quickly absorbs HF, will be mixed with polymer D which absorbs HF more slowly, but has a higher capacity for absorbing HF. This polymer mixture will then be added to HF. The resulting gel will form quickly and will have an acceptably high capacity for HF.

Example 26

Polymer A, B, and D will be mixed and then added to HF. The resulting gel will form quickly, will have a good capacity for absorbing HF, an acceptably low vapor pressure, and a reduced tendency to form HF aerosol droplets.

TABLE 1

Polymer Capacity (grams HF/gram polymer)

| Ex. No. | | Avg. Value | Avg. Value (vapor expt) |
|---|---|---|---|
| 1 | Stockosorb ® M (polyacrylate-polyacrylamide cross-linked copolymer) | 45.20 | |
| 2/5 | Stockosorb ® CW (polyacrylate-polyacrylamide cross-linked copolymer) | 52.72 | 39.26 |
| 3/6 | Stockosorb ® FW (polyacrylate-polyacrylamide cross-linked copolymer) | 75.42 | 27.14 |
| 4 | Stockosorb ® SW (polyacrylate-polyacrylamide cross-linked copolymer) | 57.56 | |
| 7 | AQUAKEEP ® (sodium polyacrylate) | 3.50 | |
| 8 | Luquasorb ® 1030 (sodium polyacrylate) | 2.50 | |
| 9 | Luquasorb ® 1270 (potassium polyacrylate) | 1.70 | |
| 10 | Luquasorb ® 1210 (sodium polyacrylate) | 2.30 | |
| 11 | AP73 (cross-linked sodium polyacrylate) | 1.50 | |
| 12 | Aldrich ® Na$^+$ salt (sodium polyacrylate) | 1.90 | |
| 13 | Aldrich ® K$^+$ salt (potassium polyacrylate) | 1.92 | |
| 14 | AP80HS (sodium polyacrylate) | 2.52 | |
| 15 | SXM 70 (salt of polycacrylic acid) | 1.83 | |

Having thus described a few particular embodiments of the invention, it will be apparent to those skilled in the art, in view of the teachings contained herein, that various alterations, modifications, and improvements not specifically described are available and within the scope of the present invention. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for preparing a hydrogen fluoride composition comprising:
   (a) providing a cross-linked copolymer comprising acrylamide units and acrylic acid salt units; and
   (b) contacting said cross-linked copolymer with anhydrous hydrogen fluoride to form a composition in the form of a solid or a gel wherein the composition comprises: hydrogen fluoride in an amount of from about 80 weight percent of the composition to about 98 weight percent of the composition; and the cross-linked copolymer in an amount from about 0.5 weight percent of the composition to about 20 weight percent of the composition, the cross-linked copolymer comprising acrylamide units cross-linked with the acrylic acid salt units, wherein said acrylic acid salt is selected from the group consisting of potassium acrylate, sodium acrylate, and ammonium acrylate, wherein said cross-linked copolymer has an average liquid hydrogen fluoride adsorption capacity of at least about 45.2 grams of HF per gram of the cross-linked copolymer.

2. The method of claim 1, wherein said acrylamide units are polyacrylamide units.

3. The method of claim 1, wherein said acrylic acid salt is potassium acrylate.

4. The method of claim 1, wherein said copolymer comprises an ion source selected from the group consisting of an alkali metal and ammonium.

5. The method of claim 1, wherein said cross-linked copolymer has a molecular weight of from about 5,000 to about 5,000,000.

6. The method of claim 1, wherein said hydrogen fluoride is anhydrous hydrogen fluoride.

7. The method of claim 1, wherein the cross-linked copolymer is mixed with a water soluble polymer selected from the group consisting of cellulose ethers, modified starches, starch derivatives, natural gum derivatives, polyacrylic acid salts, ethylene oxide polymer, methacrylic acid polymer, polyethyleneimine polymer, polyvinyl pyrrolidone polymer and mixtures thereof.

8. A method for recovering hydrogen fluoride comprising:
   (a) preparing a hydrogen fluoride composition according to claim 1; and
   (b) treating the composition so as to liberate a hydrogen fluoride vapor.

9. A method of recovering hydrogen fluoride comprising:
   (a) preparing a hydrogen fluoride composition according to claim 1; and
   (b) using said composition as a catalyst, fluorinating agent, or chemical reactant in a chemical reaction.

10. A method for transporting hydrogen fluoride comprising the steps of:
    (a) preparing a hydrogen fluoride composition according to claim 1;
    (b) storing the composition in a storage container; and
    (c) transporting the storage container to a destination.

* * * * *